United States Patent [19]

Matthews

[11] Patent Number: 4,541,539
[45] Date of Patent: Sep. 17, 1985

[54] COMPOSITE FISHERMAN SUPPORT SYSTEM

[76] Inventor: Carroll H. Matthews, 5901 Castlebrook Dr., Raleigh, N.C. 27604

[21] Appl. No.: 579,449

[22] Filed: Feb. 13, 1984

[51] Int. Cl.$^4$ ............................................. A63D 55/00
[52] U.S. Cl. ........................................ 220/20; 220/23; 43/26; 312/100; 312/235 R; 312/237
[58] Field of Search ............... 220/20, 21, 22, 23.83, 220/23.86, 23, 3.1, DIG. 10; 43/57.5 R

[56] References Cited

U.S. PATENT DOCUMENTS 4,128,170 12/1978 Elliott ........................... 220/20 X
4,228,894 10/1980 Lyles .............................. 220/20

FOREIGN PATENT DOCUMENTS 857141 12/1970 Canada ............................ 220/23

Primary Examiner—Steven M. Pollard
Attorney, Agent, or Firm—Mills & Coats

[57] ABSTRACT

This invention is a composite support system for fisherman including a compartmented cooler for both bait and catch as well as for drinks, food and the like. Also a tackle box means is provided as is a cutting board area along with built-in rod holders to meet all of the basic needs of the fisherman which ordinarily requires a multiplicity of various and sundry pieces of equipment to accomplish the same result.

12 Claims, 7 Drawing Figures

COMPOSITE FISHERMAN SUPPORT SYSTEM

FIELD OF THE INVENTION

This invention relates to fishing and more particularly to fisherman support means.

BACKGROUND OF INVENTION

Since man first began catching fish he has been interested in better and more efficient equipment. This not only goes to the rigs used for catching of the fish but also to the support equipment so vitally necessary to both the effectiveness of the fishing and the comfort of the fisherman.

Referring more specifically to shore fishing, when a vehicle can be driven up to a point adjacent the shore, the various pieces of equipment needed can without too great an effort be unloaded and used. On the other hand, when the shore is remote from the nearest vehicle access, then all of the fishing gear and support equipment must be carried to the fishing location. There are many more remote fishing spots along rivers, farm fishing ponds and along the coast line than there are readily accessable areas.

In this latter instance, surf fisherman are given access to literally hundreds of miles of shore line which are barred to vehicular traffic because of the fragile ecology of such areas.

When a fisherman such as a surf fisherman has to carry a cooler with his bait, drinks and foods as well as his rod spikes, rods and reels, tackle box, folding seat, bait board, and the like for a one-half mile or more, he must be either greatly over loaded himself or make two trips, either of which is burdensome at best and can take all of the fun and desire out of fishing at worst.

BRIEF DESCRIPTION OF INVENTION

After much research and study into the above-mentioned problems, the present invention has been developed to provide a convenient, easily managable composite fisherman support system which includes a combination cooler which is so divided to keep bait, drinks and food segregated from each other, a tackle box, a cutting board, rod holders, and seat means in a single integral unit which is easily transported to and from the fishing site thus greatly enhancing the fun and enjoyment of shore fishing by greatly reducing a most aggravating problem i.e. the transport of support equipment to the remote fishing location.

In view of the above, it is an object of the present invention to provide and improved fisherman support system.

Another object of the present invention is to provide a means for consolidating the support equipment required by shore fisherman and particularly by surf fisherman.

Another object of the present invention is to provide a composite fisherman support system which is well organized, convenient, and lightweight.

Another object of the present invention is to provide a relatively inexpensive and yet highly efficient fisherman support system.

Another object of the present invention is to provide a system for organizing surf and shore fisherman in a composite manner to eliminate the loss or misplacement of specific pieces of gear.

Another object of the present invention is to provide a fisherman support system which is corrosion and rust proof.

Other objects and advantages of the present invention will become apparent and obvious from a study of the following description and the accompanying drawings which are merely illustrative of such invention.

DETAILED DESCRIPTION OF INVENTION

Figure 1:
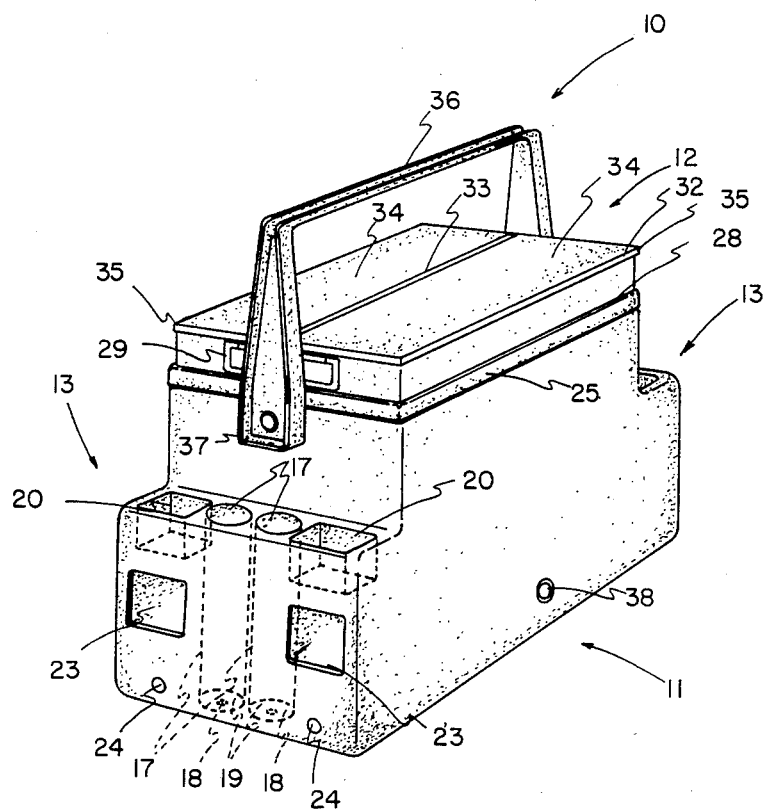
FIG. 1 is a perspective view of the composite fisherman support system of the present invention.

With further reference to the drawings, the composite fisherman support system of the present invention, indicated generally at 10, includes a cooler portion, indicated generally at 11, a tackle box portion, indicated generally at 12, and a pair of wing portions, indicated generally at 13.

The cooler and wing portion 11 and 13 are preferably integrally formed from a scuff resistant plastic type material by blow molding or similar processes. Since plastics and molding techniques of this type are both well known to those skilled in the art, further detailed discussion of the same is not deemed necessary.

Within the interior of the cooler portion 11 is an insulated liner 14. This insulated liner includes a longitudinal divider 15 which extends from the bottom of such liner up the ends thereof approximately two-thirds of their height as can clearly be seen in FIGS. 6 and 7. A transverse divider or partition 16 extends from the longitudinal divider 15 to the side of the cooler liner with the top edge lying generally in the same plane as said longitudinal divider thereby forming separate compartments with in the cooler.

Each of the wing portions 13 have a pair of generally cylindrical walls 17 therein which form holders for the butt or handle ends of fishing rod (not shown). The bottom 18 of each fishing rod holders 17 includes a drain opening 19 so that water will not accumulate in such rod holders.

On either side of rod holders 17 on the upper outer edges of each of the wings 13 are bait and fishing gear holders 20. The bottom 21 of each of these holders includes a slot like opening 22 which is used as a knife holder and is adapted to receive the blade thereof (not shown).

Below each of the bait and gear holders are storage compartments having an opening 23 for access thereinto. Each of these storage compartments are defined by a rod holder 17, the end of cooler liner 14, the side of the wing portion 13, the end of the wing portion 13, the bottom 21 of the bait and gear holder, and the bottom of the wing portion 13. A drain hole 24 is provided for each of the storage compartments 23 to prevent accumulation of water therein either from storage of wet articles, water spray, rain, or other ambient conditions encountered during use.

A cooler top or lid 25 is provided which is formed from a material similar to the exterior of cooler and wind portions of the composite system 10 of the present invention and preferably includes an insulated core. This cooler lid is adapted to mount flush on top of the walls of the cooler portion 11 and includes an inwardly projecting tongue or ridge 26 which is adapted to lie juxtaposed to the interior of cooler liner 14 to form a tight seal between the cooler lid and the cooler portion.

Figure 6:
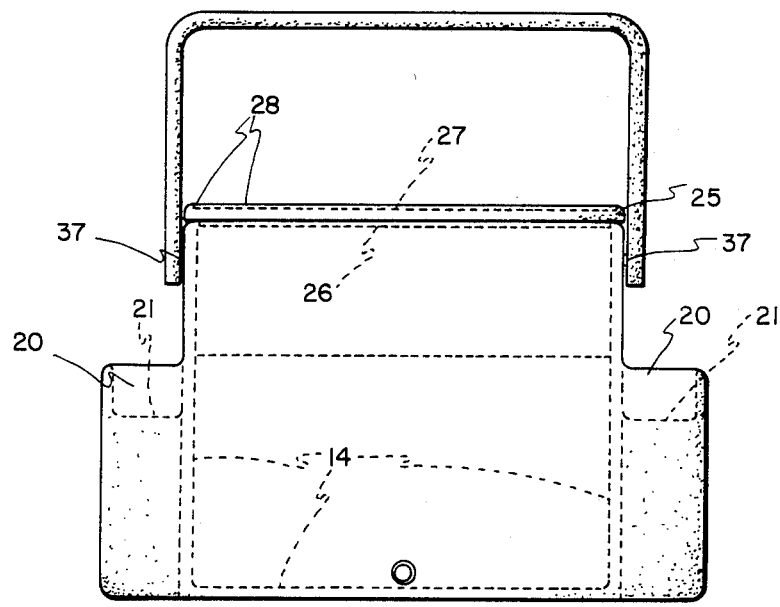
FIG. 6 is a side elevational view showing the interior configuration of the cooler portion of the present invention.
Figure 7:
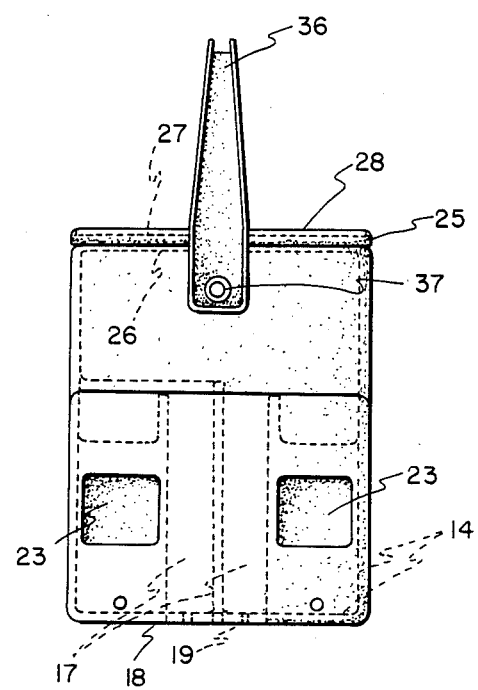
FIG. 7 is an end elevational view thereof.

A depression 27 is formed in the top or outer surface of lid 25 as shown in dotted lined in FIGS. 6 and 7 so that the outer edge thereof forms an upwardly projecting circumventional lip 28 about the upper edge of said lid 25.

Figure 2:
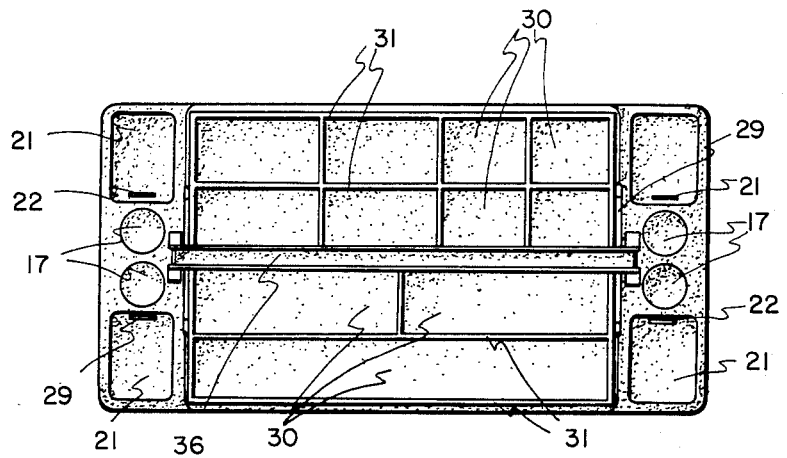
FIG. 2 is a top plan view thereof.
Figure 3:
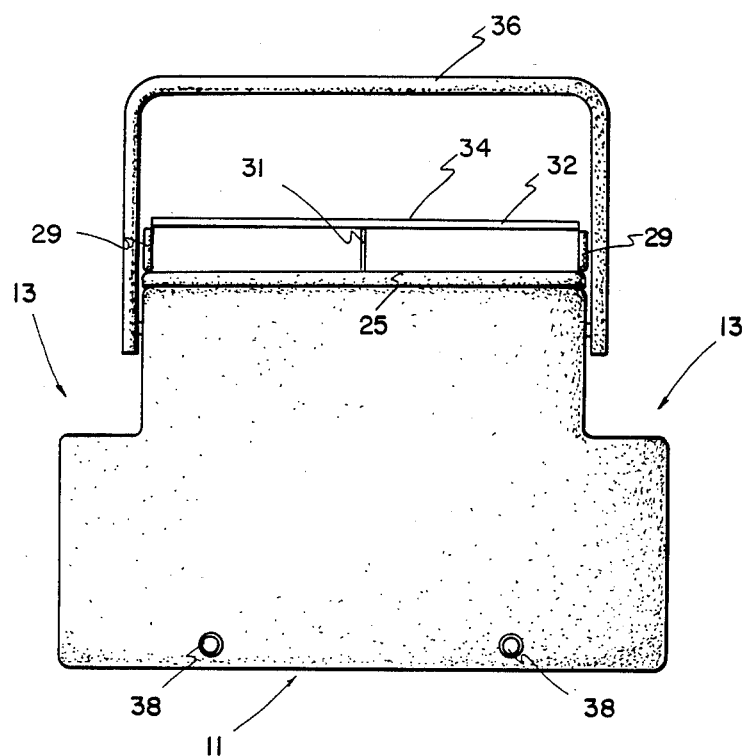
FIG. 3 is a side elevational view thereof.
Figure 4:
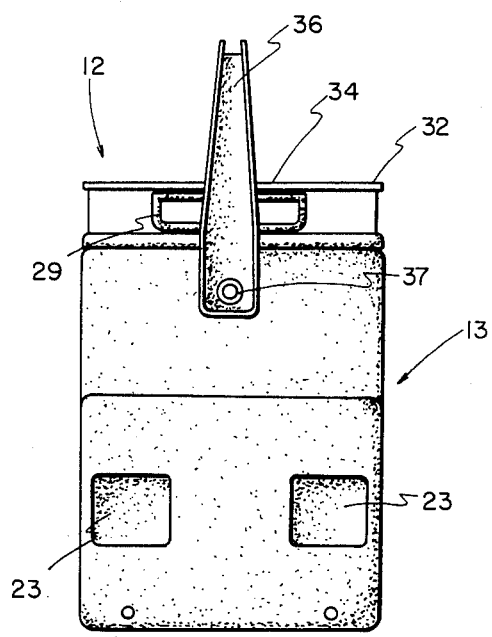
FIG. 4 is an end elevational view thereof.
Figure 5:
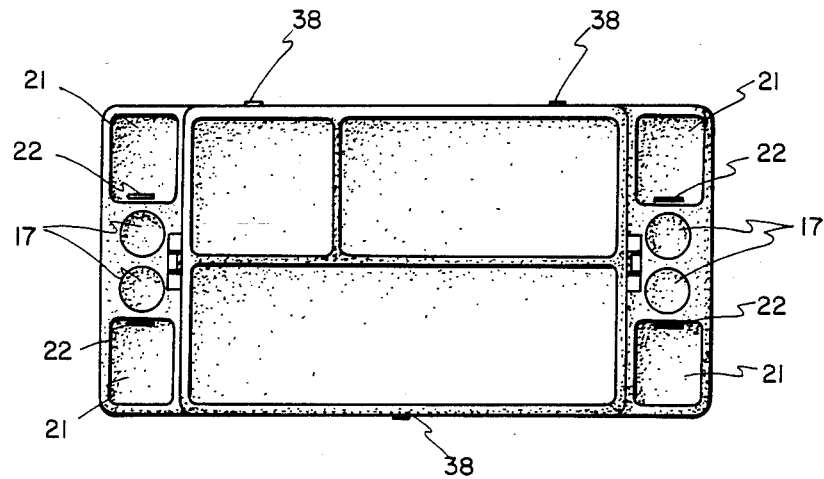
FIG. 5 is a top plan view of the present invention with the top removed.

The tackle box 25 of the present invention is so sized to nestingly fit within the depression 26 formed by circumventional lip 28 of cooler lid 25 as can clearly be seen in FIGS. 1, 2 and 3.

This tackle box portion is preferably formed from a transparent plastic material so that various pieces of tackle can be scrutinized prior to opening of the box to remove the same. On each end of the tackle box 12 is provided a handle 29 for lifting the tackle box clear of the cooler portion when desired.

A plurality of compartments 30 are formed by a series of interior partitions 31 within tackle box 12 as can clearly be seen in FIG. 2.

The lid or top 32 of tackle box 12 is preferably formed in two portions which are hindgedly attached to such box by way of a central hindge 33. One or both of these tackle box lids can be formed form a cut resistant material such as hardwood so that the same can be used both as a closure and a cutting board used for cutting bait, filleting fish, and other and sundry uses.

The tackle box lids 32 can be constructed of a composite material such as plastic with the upper surface being laminated thereto or such wooden lids can be solid wood. Also lids slightly overhang the sides and ends of the tackle box with a slight downwardly projecting lip 35 thereabout so water will be prevented from entering the compartments of such box.

A generally U-shaped handle 36 is provided which is pivotly connected to the end walls of the cooler portion 11 by means such as pivot pins 36 as can clearly be seen in FIGS. 1, 4, 6 and 7. Handle 36 can be formed from erosion resistant metal such as aluminum aloy or from a suitable plastic material. It should also be noted that the handle is channel shaped to give it added rigidity. Further, the handle is so sized that when not used for transporting the composite system of the present invention, it can be folded down out of the way juxtaposed to either side of the cooler portion 11.

A plurality of closeable drains 38 are provided in the lower portion of the cooler 11 and communicate from the exterior thereof into each of the compartments therein. Since closeable drains of this type are well known to those skilled in the art, further detailed discussion of the same is not deemed necessary.

From the above it can be seen that the present invention has the advantage of providing a compact fisherman's support system which is both easy to transport and convenient to use. The present invention eliminates the necessity for multiple support equipment to be transported by a fisherman to the selected fishing site. The present invention further so well organizes the various pieces of equipment used by the fisherman that storage of the same when not in use is greatly simplified. Also preparation to go fishing requires nothing more than perishables such as ice, food and bait to be loaded into the cooler portion with departure immediately thereafter being taken.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A composite support system comprising: an insulated cooler means; at least one equipment holder means integrally formed with said cooler means; separate and detachable tackle box means mounted on said cooler means; and cutting board means mounted on said tackle box means whereby a composite support system for fishing and similar endeavors is provided.

2. The support system of claim 1 wherein said cooler means includes a top closure means.

3. The support system of claim 2 wherein said tackle box means mounts on said closure means.

4. The support system of claim 1 wherein said equipment holder means includes at least one rod holder means.

5. The support system of claim 1 wherein said equipment holder means includes at least one bait and gear holder means.

6. The suppot means of claim 1 wherein said equipment holder means includes at least one knife holder means.

7. The support system of claim 1 wherein said equipment holder means includes at least one storage compartment means.

8. The support system of claim 1 wherein said cooler means in internally compartmented.

9. The support system of claim 1 wherein said tackle box means is interiorly compartmented.

10. The support system of claim 1 wherein said cooler means includes a pivoted carrying handle.

11. The support system of claim 1 wherein said cutting board means is hingedly connected to said tackle box means to form a tackle box lid.

12. The support system of claim 1 wherein said cutting board means doubles as a seat means.

* * * * *